United States Patent [19]

Watanabe et al.

[11] Patent Number: 5,119,900

[45] Date of Patent: Jun. 9, 1992

[54] FOUR WHEEL DRIVE SYSTEM

[75] Inventors: Kenichi Watanabe; Eiji Nishimura; Osamu Kameda, all of Hiroshima, Japan

[73] Assignee: Mazda Motor Corporation, Hiroshima, Japan

[21] Appl. No.: 623,103

[22] Filed: Dec. 6, 1990

[30] Foreign Application Priority Data

| Dec. 9, 1989 | [JP] | Japan | 1-319775 |
| Dec. 20, 1989 | [JP] | Japan | 1-332286 |
| Feb. 19, 1990 | [JP] | Japan | 2-37782 |

[51] Int. Cl.$^5$ ............ B60K 17/354; B60K 23/08
[52] U.S. Cl. ............ 180/245; 180/247; 180/249
[58] Field of Search ............ 180/244, 245, 246, 247, 180/248, 233, 249

[56] References Cited

U.S. PATENT DOCUMENTS

| 3,916,625 | 11/1975 | Holtkamp | 180/247 |
| 4,681,180 | 7/1987 | Oyama et al. | 180/76 |
| 4,723,624 | 2/1988 | Kawasaki et al. | 180/233 |
| 4,770,266 | 9/1988 | Yamaguchi et al. | 180/244 X |
| 4,776,424 | 10/1988 | Naito | 180/233 |
| 4,921,065 | 5/1990 | Hamada et al. | 180/245 |
| 4,936,406 | 6/1990 | Tezuka et al. | 180/249 |
| 4,949,265 | 8/1990 | Eguchi et al. | 180/142 X |
| 5,014,809 | 5/1991 | Matsuda | 180/248 |

*Primary Examiner*—Charles A. Marmor
*Assistant Examiner*—Kevin Hurley
*Attorney, Agent, or Firm*—Fleit, Jacobson, Cohn, Price, Holman & Stern

[57] ABSTRACT

A four wheel drive system for a vehicle includes comprising a power plant for producing a driving force, a front wheel driving mechanism for transmitting the driving force to drive right and left front wheels, a rear wheel driving mechanism for transmitting the driving force to drive right and left rear wheels, and right and left wheel clutches provided in one of the driving mechanisms for controlling the amount of the driving force transmitted to the wheels. A cut-off clutch is provided for controlling the driving force transmitted to the wheels of the one of the driving mechanisms, and a control device causes the cut-off clutch to engage before the wheel clutch is engaged. The driving force is transmitted sequentially rather than instantly from the cut-off clutch, the wheel clutches and to the wheels so as to suppress the torque shock creative in connection with a change in the drive condition.

15 Claims, 9 Drawing Sheets

FOUR WHEEL DRIVE SYSTEM

BACKGROUND OF INVENTION

1. Field of the Invention

This invention relates to a four wheel drive system for driving both front wheels and rear wheels of a vehicle by virtue of a power plant.

2. Description of Related Art

In four wheel drive vehicles, it has been known that a cut-off clutch may be provided between the power plant and either a front wheel driving system or a rear wheel driving system. The cut-off clutch is disengaged to establish a two wheel driving system when the four wheel drive condition is not necessary to be maintained so that a power loss is reduced to improve fuel consumption efficiency.

Japanese Patent Public Disclosure No. 62-181916, laid open to the public in 1987, proposes a four wheel drive system in which driving power is transmitted from the power plant to the rear wheels. The proposed four wheel drive system is provided with hydraulic clutches (hereinafter referred to as wheel clutches) on a driving mechanism for the right and left rear wheels, respectively, to control driving torque for the right and left rear wheels. As a result, torque distribution between the right and left rear wheels is controlled to improve controllability of a vehicle in a steering condition.

The wheel clutch can be provided in either the front or rear wheel drive mechanism.

Thus, appropriate torque distribution can be made between the front and rear drive system and/or between the right and left wheels to improve controllability.

It should be noted, however that a torque shock may occur when the cut-off clutch and the wheel clutches are engaged to transfer from the two wheel drive condition to the four wheel drive condition. This is because torque from the power plant is abruptly transmitted to the wheels.

SUMMARY OF THE INVENTION

It is, therefore, an object of the invention to reduce the torque shock in the case where a switching operation is made between the two wheel drive condition and the four wheel drive condition.

It is another object of the invention to reduce the torque shock when the wheel clutches are engaged.

It is still another object of the present invention to improve durability of bearing devices and oil sealing devices and the like, which are employed in the four wheel drive system.

The above and other objects of the invention can be accomplished by a four wheel drive system of a vehicle comprising a power plant for producing driving force, a front wheel driving mechanism for transmitting the driving force to drive right and left front wheels, a rear wheel driving mechanism for transmitting the driving force to drive the right and left rear wheels, right and left wheel clutches provided in one of the driving mechanisms for controlling the amount of the driving force transmitted to the wheels, a cut-off clutch for controlling the driving force transmitted to the wheels of the one of the driving mechanisms, and control means for engaging the cut-off clutch before the wheel clutch is engaged.

In another aspect of the invention, the cut-off clutch is temporarily engaged at a predetermined time interval in the case where both the cut-off clutch and the wheel clutches are disengaged.

In preferred control, the control means disengages the cut-off clutch after the wheel clutches are disengaged.

Further, the control means preferably disengages the wheel clutches when an anti-lock braking system is in operation.

In a preferred embodiment, the control means increases a torque distribution ratio for the rear wheels as speed difference between the front and rear wheels is increased.

The control means may increase torque distribution ratio for the rear wheels as speed difference between the right and left wheels is increased and may increase torque distribution ratio for the rear wheels as vehicle speed is increased.

In a preferred embodiment, there is further provided a pair of control valves for driving the right and left wheel clutches. The control valves are controlled by the control means to control hydraulic pressure introduced into the wheel clutches so that engaging force of the wheel clutches are changed respectively.

In another preferred embodiment, a speed reduction mechanism is connected with an input shaft of the one of the driving mechanisms for reducing a rotation speed of the input shaft transmitted to the wheels driven through the one of the driving mechanisms. The speed reduction mechanism includes a ring gear case in which the wheel clutches are disposed.

There is provided an oil pump connected with and driven by the input shaft of the one of the driving mechanisms for producing the hydraulic pressure for the wheel clutches. A casing is provided for receiving the ring gear case of the speed reduction mechanism and the oil pump.

According to the present invention, in the case where the drive condition is changed from the two wheel drive condition to the four wheel drive condition, the cut-off clutch is engaged before the wheel clutch is engaged. On the contrary, when the cut-off clutch is disengaged after the wheel clutches are disengaged. Thus, the driving force is transmitted not instantly but sequentially from the cut-off clutch, the wheel clutches and thereafter to the wheels so as to suppress the torque shock of the vehicle in connection with a change in the drive condition.

Alternatively, the cut-off clutch is temporarily engaged at predetermined intervals so that the driving mechanism having the wheel clutches can get enough lubrication for bearing and oil sealing and the like provided therein. Further, a compact hydraulic control system is provided for controlling the wheel clutches.

The above and other objects and features of the present invention will be apparent from the following description making reference to the accompanying drawings.

DESCRIPTION OF THE PREFERRED EMBODIMENTS

Figure 1:
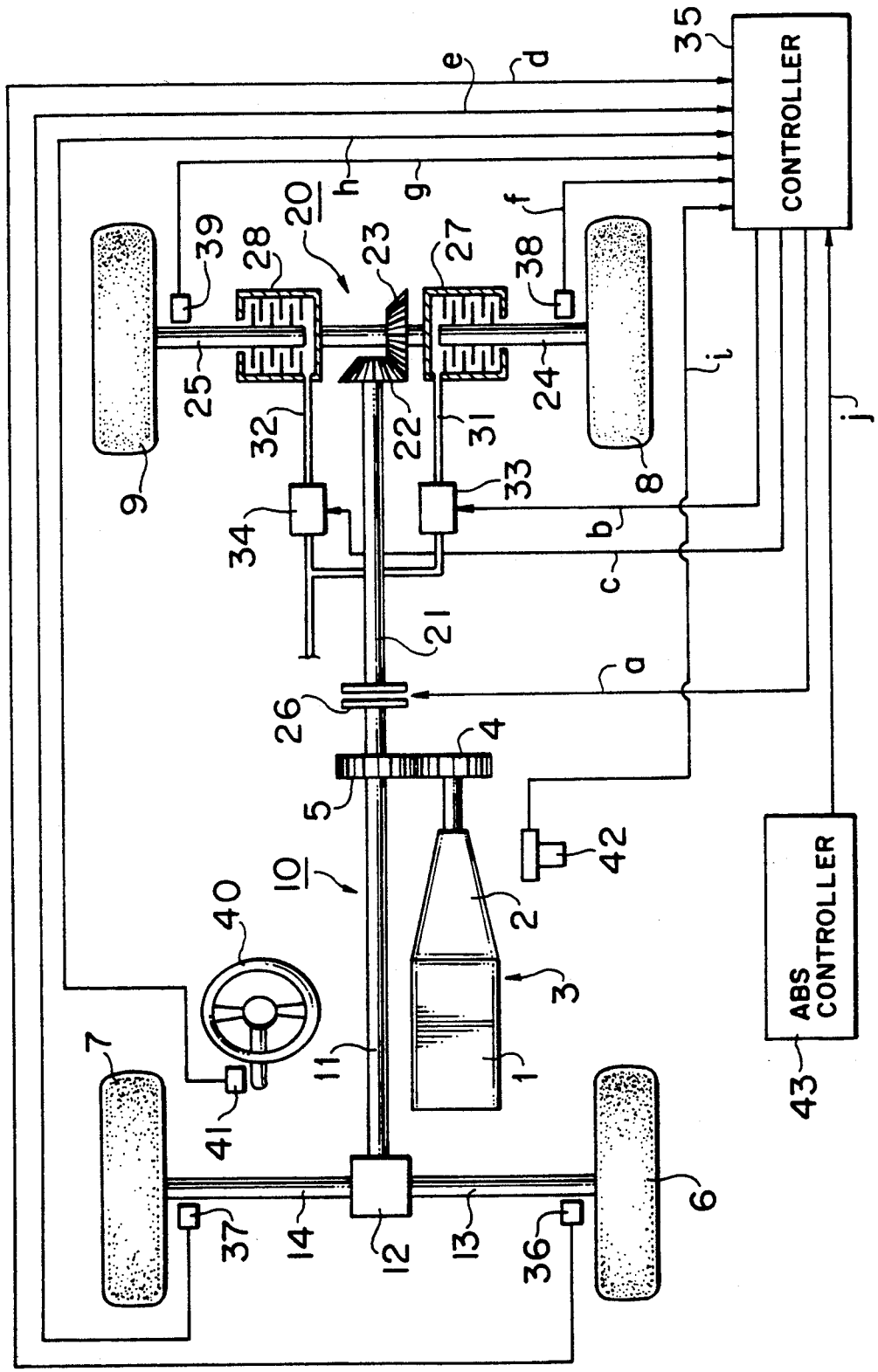
FIG. 1 shows a schematic view of a four wheel drive system in accordance with a preferred embodiment of the present invention.

FIG. 1 shows a schematic view of a four wheel drive system provided with a control system therefor according to a preferred embodiment of the present invention.

Referring to FIG. 1, an illustrated four wheel drive vehicle is provided with a power plant 3 constituted by an engine 1 and a transmission 2, a front wheel drive mechanism 10 for driving right and left front wheels 6, 7 and a rear wheel drive mechanism 20 for driving a right and left rear wheels 8, 9 to which a driving force produced by the power plant 3 is transmitted through a pair of power transmitting gears 4, 5.

The front wheel drive mechanism 10 extends in a longitudinal direction of the vehicle and is provided with a front drive shaft 11 driven by the driving force of the power plant 3 transmitted through the gears 4 and 5, a differential mechanism 12 for sharing the driving force through the front axle 11, a right axle 14 and left axle 13 to which the driving force is allotted through the differential mechanism 12 and which transmit the allotted driving force to the right and left wheels 6, 7 so that the front wheels 6 and 7 are always driven by the driving force of the power plant.

The rear wheel drive mechanism 20 extends in a longitudinal direction of the vehicle and is provided with a rear drive shaft 21 driven by the driving force of the power plant 3 transmitted through the gears 4 and 5, a right axle 25 and left axle 24 which are driven by the drive shaft 21 through bevel gears 22, 23 and transmit the driving force to the right and left wheels 9, 8 so that the front wheels 6 and 7 are always driven by the driving force of the power plant.

On the rear drive shaft 21 is disposed a cut-off clutch 26 for controlling the driving force transmitted to the rear axles 24, 25 or the rear wheels 8 and 9. On the rear axles 24 and 25 are disposed wheel clutches 27 and 28 in the form of multi-plate hydraulic clutches for controlling the driving force transmitted to the rear wheels 8 and 9. The wheel clutches 27 and 28 are provided with a plurality of clutch plates driven by a hydraulic pressure which is introduced from a hydraulic pressure source such as an oil pump through oil passages 31, 32 and controlled by pressure control valves 33, 34.

A controller 35 is provided for controlling the cut-off clutch 26 and the control valves 33 and 34. The cut-off clutch 26 is controlled, by a control signal a produced by the controller 35, to be disengaged and engaged.

The control valves 33 and 34 with solenoids are controlled by signals b, c from the controller 35 to control the hydraulic pressure for the wheel clutches 27 and 28 so that torques transmitted to the wheel clutches 27 and 28 are changed continuously.

The controller 35 receives signals d, e, f and g from wheel speed sensors 36–39 for detecting wheel rotation speed of the wheels 6–9, a signal h from a steering sensor 41 for detecting a steering amount of steering wheel 40, a signal i from a lateral acceleration sensor 42 for detecting lateral acceleration acting on the vehicle body and a signal j from an ABS controller 43 for controlling an anti-lock braking system. The controller 35 controls the cut-off clutch 26 and the right and left clutches 28, 27 based on the signals d–j.

Figure 2:
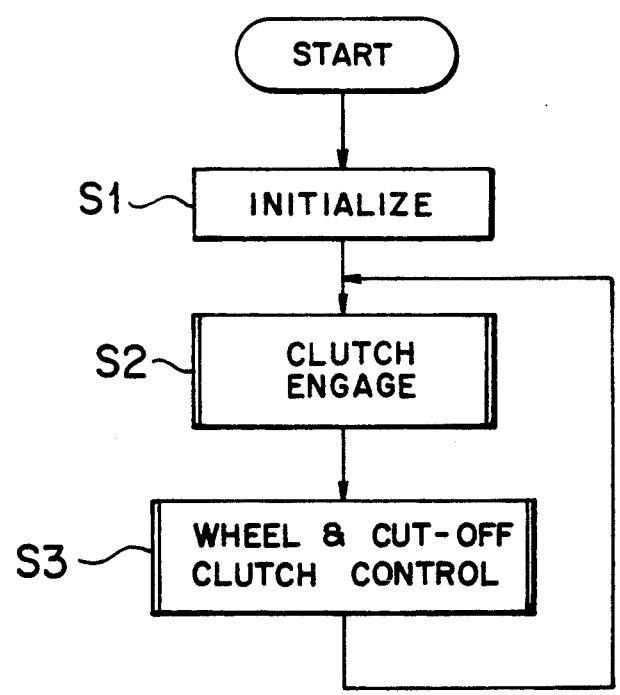
FIG. 2 is a flow chart of a main control program for a driving force distribution.

Referring to FIG. 2, there is shown a flow chart of a main routine by the controller 35. In step S1 the controller 35 initializes the system including variables and flags employed in the control. In step S2, the controller 35 determines a torque distribution ratio between the right and left rear wheels 9, 8. In step S3, the controller 35 produces the signals b and c to the hydraulic pressure control valves 33 and 34 for accomplishing the torque distribution determined by the step S2 and produces the signal a for disengaging and engaging the cut-off clutch 26.

Figure 3:
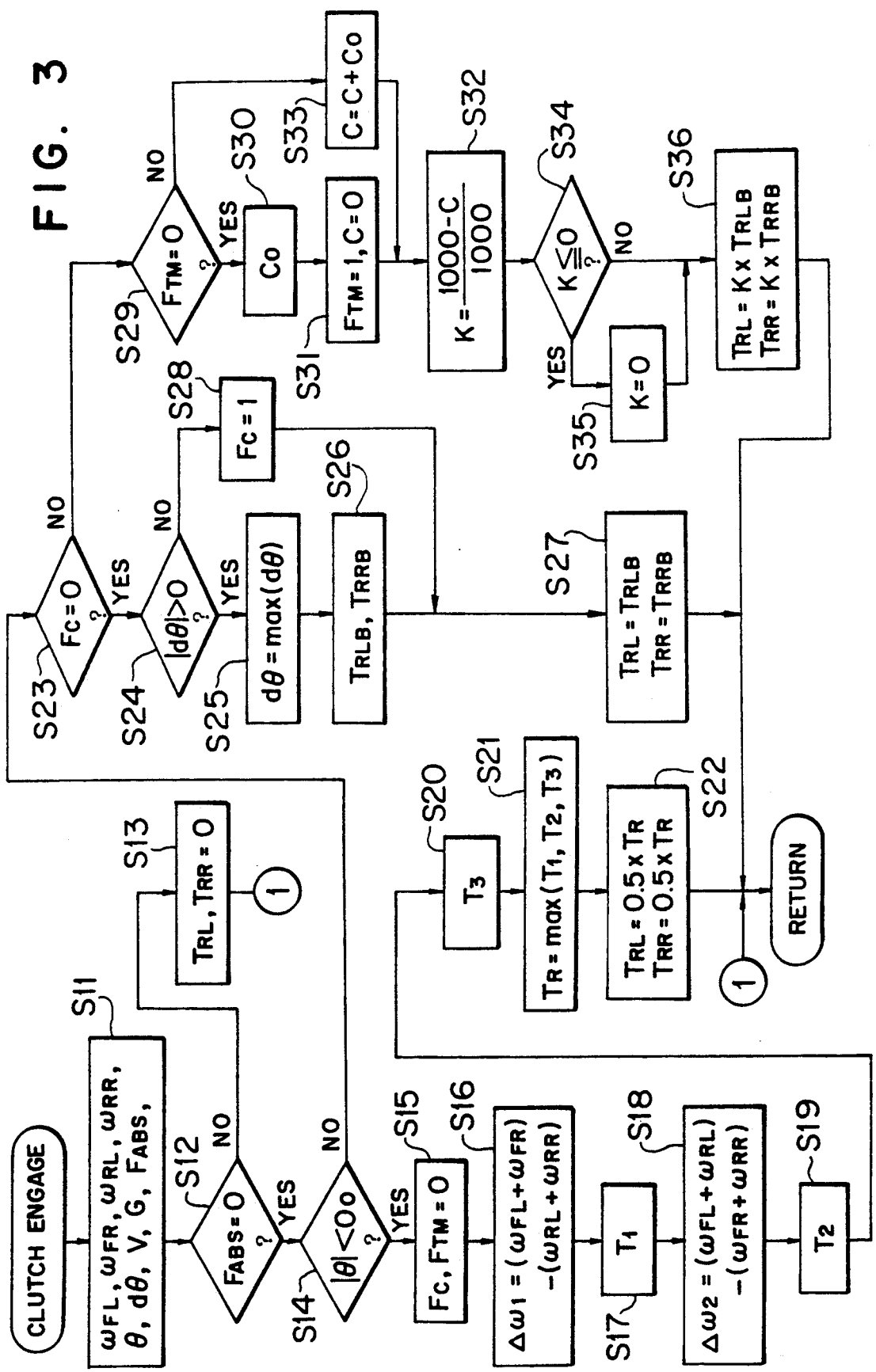
FIG. 3 is a flow chart of a clutch control in accordance with the preferred embodiment.

The hydraulic pressure for the clutches 27 and 28 are controlled in accordance with a subroutine shown in FIG. 3 in the form of the flow chart.

According to the hydraulic pressure control for the clutches 27 and 28, the controller 35 obtains the wheel rotation speeds $\omega_{FL}$, $\omega_{RF}$, $\omega_{RL}$, $\omega_{RR}$, the steering angle $\Theta$, the steering angle change rate $d\Theta$, the vehicle speed V and the lateral acceleration G, through the signals from the sensors 36–39, and ABS signal $F_{ABS}$ through the signal j from the ABS controller 43 which indicates if the ABS controller 43 is in the ABS control. In this case, the steering angle change rate $d\Theta$ can be calculated based on the steering angle $\Theta$. The vehicle speed is provided as a slowest value among the wheel speeds $\omega_{FL}$, $\omega_{FR}$, $\omega_{RL}$, $\omega_{RR}$.

Next, the controller 35 judges the value of the ABS signal $F_{ABS}$. When the ABS signal $F_{ABS}$ is 1, in other words, when the ABS control is being carried out, both the torque distribution $T_{RL}$ for the left rear wheel 8 and the torque distribution $T_{RR}$ for the right rear wheel 9 are set at 0. In this case, the hydraulic pressure is not introduced into the wheel clutches 27 and 28 and they are disengaged. Thus, the driving force from the power plant 3 is not transmitted to the rear wheels 8 and 9. As a result, the rear wheels 8 and 9 can be rotated freely to accomplish a desirable ABS control.

On the other hand, when the ABS control is not being carried out, the value of the ABS signal $F_{ABS}=0$. In this case, the controller 35 executes steps S12 to S14 and judges whether or not the absolute value of the steering angle $\Theta$ is smaller than a predetermined value $\Theta_0$. The predetermined value $\Theta_0$ denotes the size of dead zone for the steering angle. Thus, when the absolute value of the steering angle $\Theta$ is within the predetermined value $\Theta_0$, it is judged that there occurs no steering operation, that is, the vehicle runs on a straight path.

When the vehicle is in the straight path running condition, the controller 35 resets values of cornering and timer flags $F_C$, $F_{TM}$ in step S15. In step S16, a speed difference $\Delta\omega_1$ between the front and rear wheels is calculated based on the following equation;

$$\Delta\omega_1 = (\omega_{FL} + \omega_{FR}) - (\omega_{RL} + \omega_{RR})$$

Figure 4:
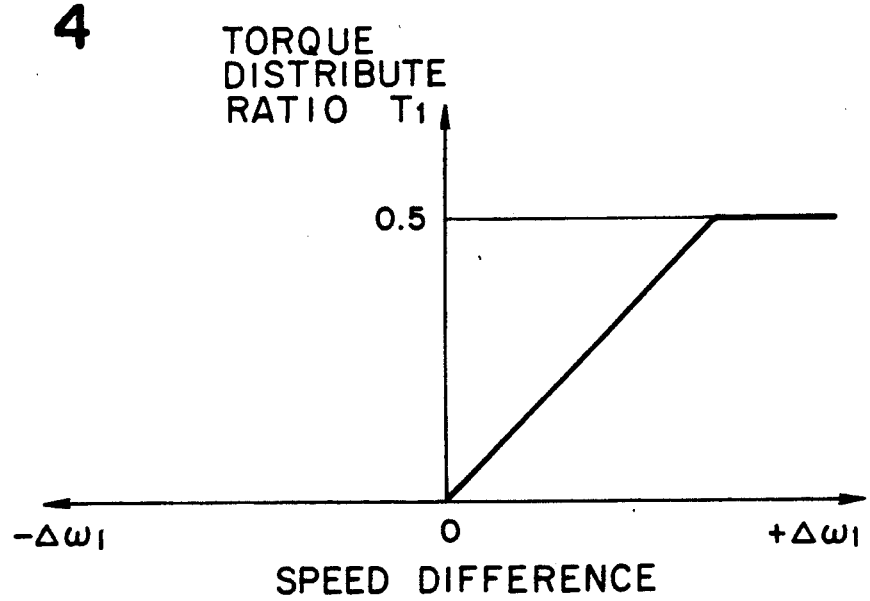
FIG. 4 and FIG. 5 are graphical representations showing a relationship between a speed difference and torque distribution ratio.

In step S17, the controller 35 obtains a first rear torque distribution ratio $T_1$ based on the speed difference $\Delta\omega_1$ in light of a map shown FIG. 4. The first rear torque distribution ratio $T_1$ is used for obtaining the final torque distribution ratios $T_{RL}, T_{RR}$. In this case, as the speed difference $\Delta\omega_1$ takes a positive value and is increased. In other words, as the rotation speed of the front wheels is greater than that of the rear wheels, the value of the first rear torque distribution ratio $T_1$ is increased as shown in FIG. 4. Thus, if slippage of the front wheels 6, 7 is increased because of a greater torque distribution thereto as compared with the rear wheels 8, 9, the torque distribution for the rear wheels 8, 9 is increased to reduce the slippage of the front wheels 6, 7.

In step S18, the controller 35 obtains a speed difference $\Delta\omega_2$ between the right wheels 7, 9, and left wheels 6, 8.

$$\Delta\omega_2 = (\omega_{FL} + \omega_{RL}) - (\omega_{FR} + \omega_{RR})$$

Figure 5:
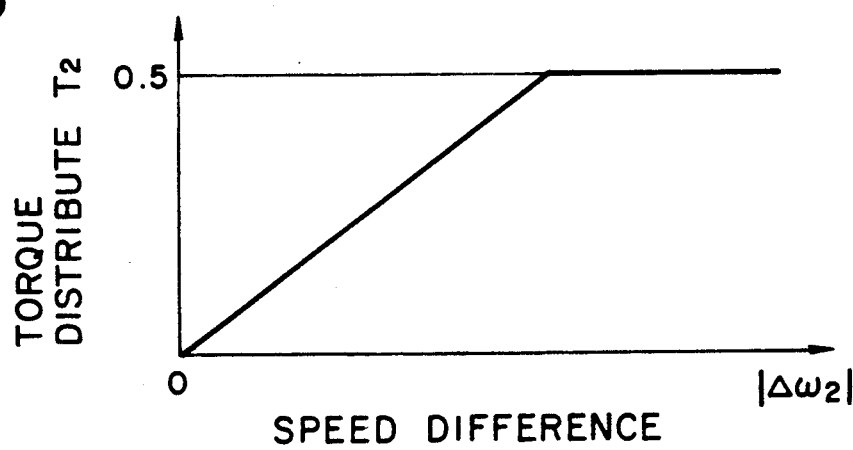

In step S19, the controller 35 obtains a second rear torque distribution ratio $T_2$ based on the absolute value of the speed difference $\Delta\omega_2$ in light of a map shown in FIG. 5. The second rear torque distribution ratio $T_2$ is used for obtaining the final torque distribution ratios $T_{RL}, T_{RR}$. In this case, as the absolute value of the speed difference $\Delta\omega_2$ is increased, the second rear torque distribution ratio $T_2$ is increased. Thus, when the speed difference $\Delta\omega_2$ between the right wheels 7, 9, and left wheels 6, 8 is increased, the torque distribution for the rear wheels 8, 9 is increased to improve running stability of the vehicle.

Figure 6:
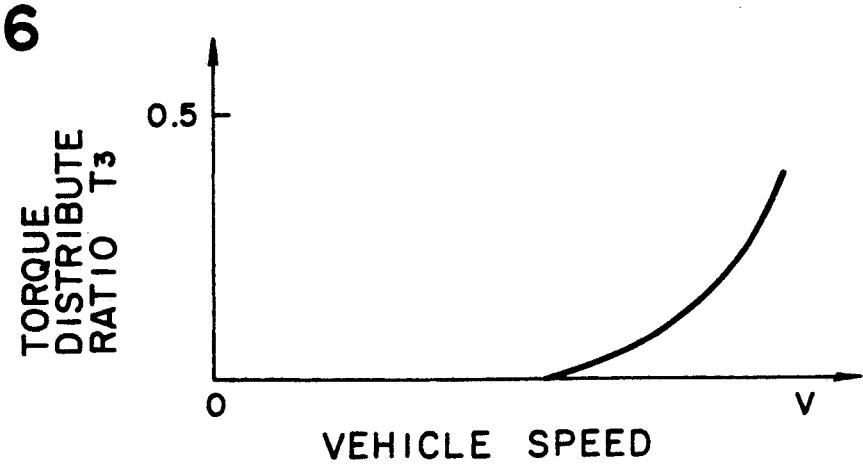
FIG. 6 is a graphical representation showing a relationship between torque distribution and vehicle speed.

In step S20, the controller 35 obtains a third rear torque distribution ratio $T_3$ in accordance with the vehicle speed V in light of a map shown in FIG. 6. The third rear torque distribution ratio $T_3$ is also used for obtaining the final torque distribution ratios $T_{RL}, T_{RR}$. In this case, as the vehicle speed V is increased, the third rear torque distribution ratio $T_3$ is increased as shown in FIG. 6. Thus, when the vehicle speed V is increased, the torque distribution for the rear wheels 8, 9 is increased to improve running stability of the vehicle on a straight path.

In step S21, the controller 35 selects the maximum value of the first, second and third torque distribution ratios $T_1$, $T_2$ and $T_3$ as a total torque distribution ratio $T_R$ for the rear wheels 8, 9. In step S22, the controller 35 allots the torque distribution ratio $T_R$ to the right and left rear wheels 8, 9 as the torque distribution ratios $T_{RL}, T_{RR}$.

Thus, when the speed differences $\Delta\omega_1$, $\Delta\omega_2$ are zero and the vehicle speed is not high, all of the first, second and third torque distribution ratios $T_1$, $T_2$ and $T_3$ become zero so that there is no torque distribution for the rear wheels 8, 9 to establish the two wheel drive condition. When one or more values of the first, second and third torque distribution ratios $T_1$, $T_2$ and $T_3$ is not zero, the driving force of the power plant 3 is transmitted to the rear wheels 8, 9 to establish the four wheel drive condition. When the four wheel drive condition is established in the straight path running condition, the torque is equally distributed to the right and left rear wheels 9, 8.

According to the illustrated embodiment, when one of the torque distribution ratios $T_1$, $T_2$ and $T_3$ takes a value greater than the maximum value 0.5, the torque is equally distributed to the respective front and rear wheels. Thus, each wheel of the vehicle gets a quarter of the driving force produced in the power plant 3.

On the other hand, when the steering angle $\Theta$ is greater than the predetermined value $\Theta_0$, that is, when the vehicle is in a cornering condition, the controller 35 carried out steps S14–S23 and judges the value of the flag $F_c$. The flag $F_c$ takes a value of zero when the vehicle runs on a straight path or when the steering angle $\Theta$ is being increased at an initial stage of the cornering condition. The flag $F_c$ takes a value of 1 when the steering angle $\Theta$ is substantially constant, that is, when the vehicle is in a stable cornering condition. Thus, the controller 35 carries out steps S23 and S24 since the flag $F_c$ takes a value zero when the vehicle is in a transitional condition from the straight path running condition to the cornering condition. The controller 35 judges whether or not the absolute value of the steering angle change rate $d\Theta$ is greater than zero in step S24. When the vehicle is in an initial stage of the cornering condition, the steering angle change rate $d\Theta$ is greater than zero. In this case, the controller 35 carries out step S25. The controller 35 sets the maximum value $max(d\Theta)$ at the current steering angle change rate $d\Theta$.

Figure 7:
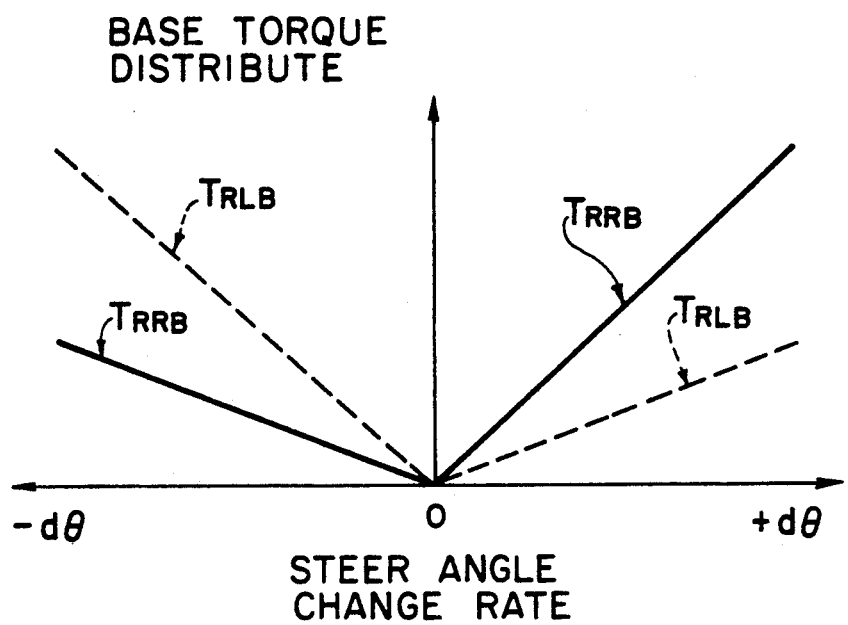
FIG. 7 is a graphical representation showing a relationship between base torque distribution ratio and steering angle change rate.

In step S26, the controller 35 sets base distribution ratios $T_{RLB}$, $T_{RRB}$ for the left and right rear wheels 8, 9 based on a map shown in FIG. 7. When the steering operation is applied on the steering wheel 21 in a counterclockwise direction, the steering angle $\Theta$ is defined as positive. Thus, if the steering operation is made in the counterclockwise direction, the base distribution ratio $T_{RRB}$ for the right rear wheel 9 is greater than the ratio $T_{RLB}$ for the left rear wheel 8. On the contrary, when the steering wheel 21 is steered in the clockwise direction, the ration $T_{RLB}$ for the left rear wheel 8 is greater than the ratio $T_{RRB}$ for the right rear wheel 9. As the steering angle change rate $d\Theta$ is increased, the base distribution ratios $T_{RLB}$, $T_{RRB}$ for the left and right rear wheels 8, 9 are increased. In step S27, the final torque distribution ratios $T_{RL}$, $T_{RR}$ are replaced by the base distribution ratios $T_{RLB}$ for the left and right rear wheels 8, 9.

Figure 9:
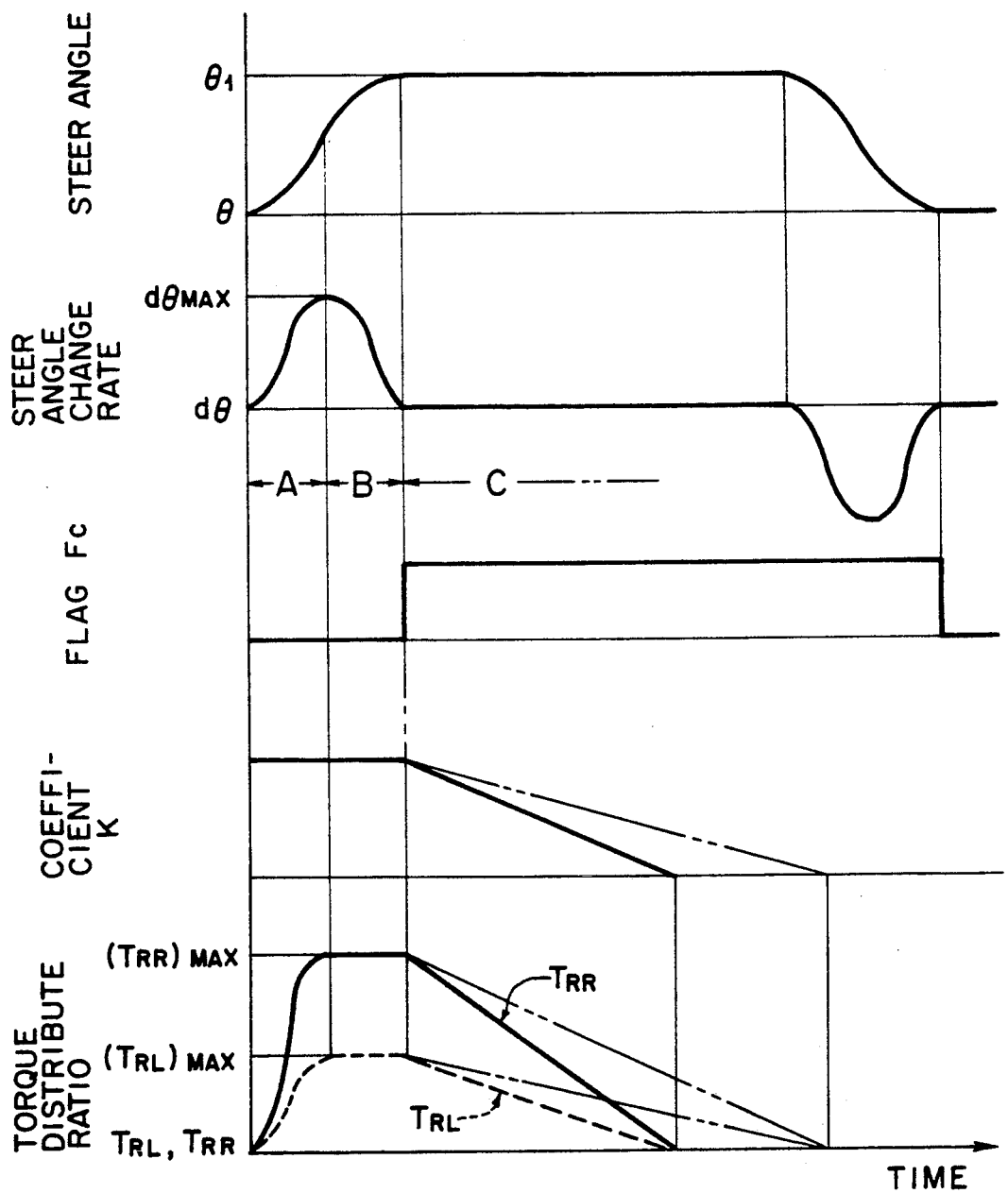
FIG. 9 is a time chart of steering angle and other variables.

As a result, as the steering angle change rate $d\Theta$ is increased (stage A), the final torque distribution ratios $T_{RL}$, $T_{RR}$ are increased as well as shown in FIG. 9. The final torque distribution ratios $T_{RL}$, $T_{RR}$ are maintained at the maximum value $(T_{RL})_{MAX}, (T_{RR})_{MAX}$ of the final torque distribution ratios which correspond to the maximum value of $max(d\Theta)$ during the period while the steering angle change rate $d\Theta$ is reduced to zero after the value $d\Theta$ takes the maximum vale $max(d\Theta)$ (stage B), that is, while the steering angle $\Theta$ reaches a peak value and takes a substantially constant value $\Theta_1$. As aforementioned, the greater torque distribution is made for the rear wheels 8, 9 until the vehicle reaches the stable cornering condition. In this case, the outer rear wheel of the cornering action gets more torque distribution than the inner rear wheel. As a result, the vehicle can get an improved controllability during the initial cornering action.

Figure 8:
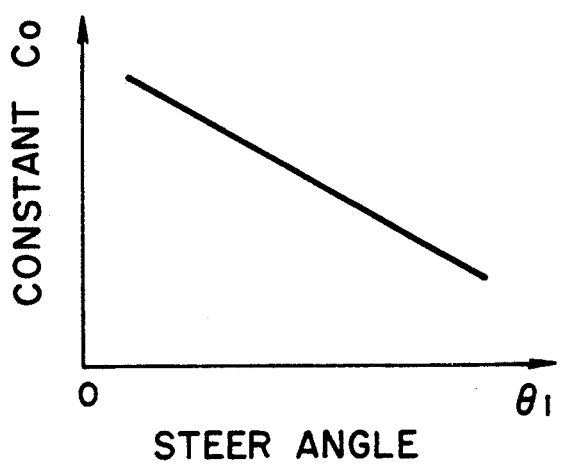
FIG. 8 is a graphical representation showing a relationship between a constant for compensating the distribution ratio and the steering angle.

Thereafter, when the vehicle reaches a constant or stable cornering condition wherein the steering angle $\Theta$ is substantially constant, the flag $F_c$ is set at 1 is step S28. The controller 35 carries out steps S23–S29 and judges the value of the timer flag $F_{TM}$. The flag $F_{TM}$ takes a value of 0 initially. Thus, the controller 35 sets a constant $C_0$ for reducing the torque distribution ratio for the rear wheels 8, 9 in step S30. The constant $C_0$ is determined based on a map shown in FIG. 8. As the absolute value of the constant steering angle $\Theta_1$ is increased, the constant $C_0$ is decreased. In step S31, the timer flag $F_{TM}$ is set at 1. A decrement C of the torque distribution ratio is rest at 0. In step S32, a decrement coefficient K is calculated by using the decrement C based on the following equation;

$$K = (1000 - C)/1000$$

The number 1000 is illustrative. The constant $C_0$ can take any value less than 1000 in this embodiment.

The decrement coefficient K is provided as a value of 1 initially. Thereafter, the value K is reduced, since the decrement C is increased by the constant $C_0$ in each cycle in steps S29–S33. When it is found that the value K is reduced below zero, the value K is fixed at zero.

The controller 35 calculates the final torque distribution ratios $T_{RL}$, $T_{RR}$ by multiplying the value K which changes between 1 and 0 into the base distribution ratios $T_{RLB}(=(T_{RL})_{MAX})$, $T_{RRB}(=(T_{RR})_{MAX})$ in step S36.

As aforementioned, the final torque distribution ratios $T_{RL}$, $T_{RR}$ is decreased from the maximum values $(T_{RL})_{MAX}$, $(T_{RR})_{MAX}$ in the stage B to zero during the constant cornering condition (stage C) as shown in FIG. 9. This means that the vehicle is gradually changed from the four wheel drive condition, to the two wheel drive condition in which only the front wheels are driven, so that a stable cornering property can be obtained in the constant cornering condition. Specifically, the constant $C_0$ is decreased as the constant steering angle $\Theta_1$ is increased. As a result, the torque distribution ratios $T_{RL}$, $T_{RR}$ are gradually reduced to zero. As seen by a phantom line in FIG. 9, it takes longer as the steering angle $\Theta_1$ is decreased to accomplish a smooth transition from the four wheel drive condition to the two wheel drive condition.

Figure 10:
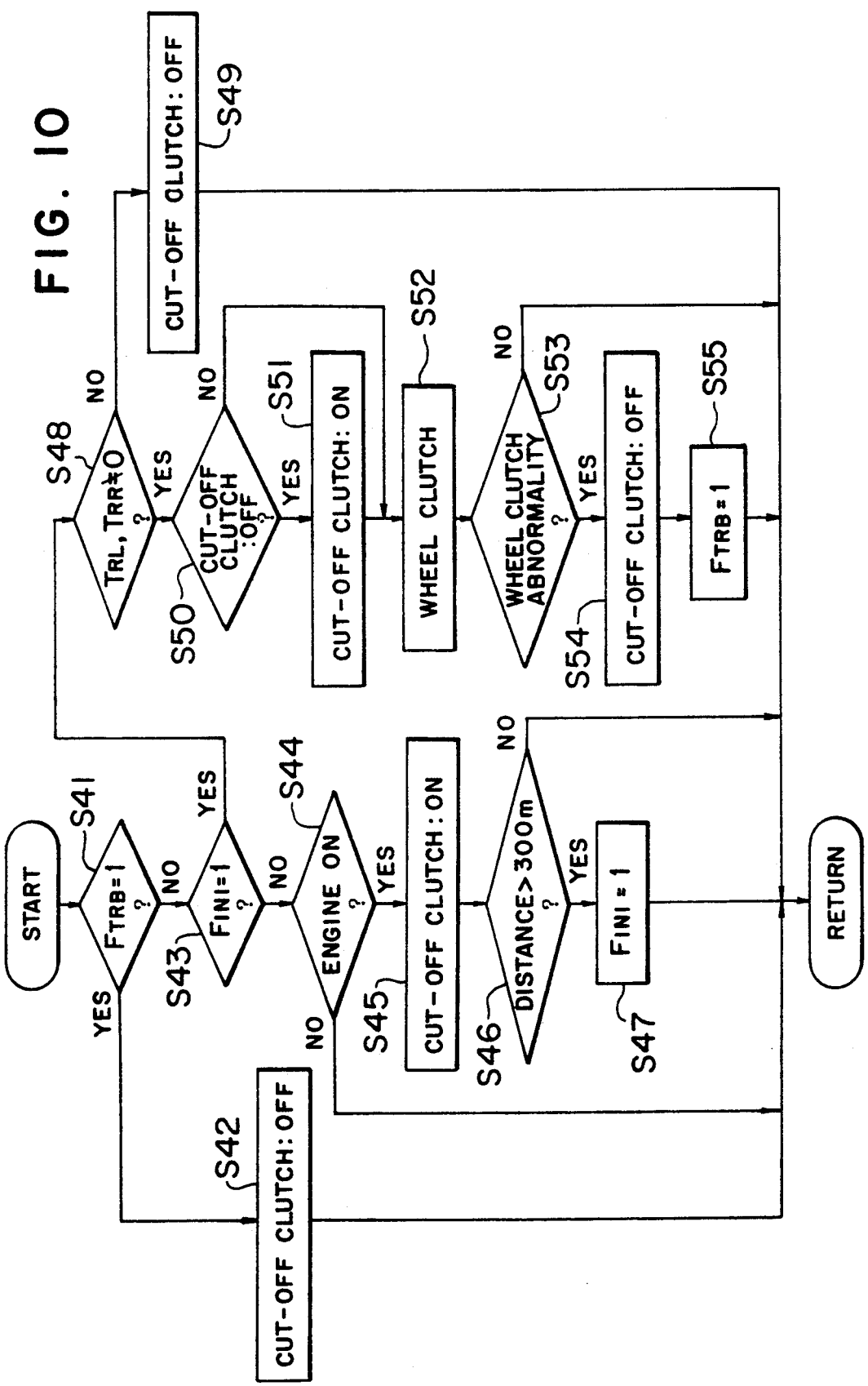
FIG. 10 is a flow chart of clutch engagement control.

After determining the torque distribution ratios $T_{RL}$, $T_{RR}$ for the rear wheels 8, 9, the controller 35 produces the control signals b, c for the pressure control valves 33, 34 for controlling on engaging level or engaging force of the wheel clutches 27, 28 to accomplish the torque distribution ratios $T_{RL}$, $T_{RR}$ and controls the cut-off clutch 26 by the signal a in accordance with a routine as shown in FIG. 10 in the form of a flow chart. The engaging force of the wheel clutches 27, 28 are changed continuously with the hydraulic pressure introduced thereinto. The hydraulic pressure is continuously controlled by the control valves 33, 34 having solenoids controlled by the signals b, c of the controller 35.

In FIG. 10, in step S41, the controller 35 judges a value of an abnormality flag $F_{TRB}$ which takes a value of 1 when both of the wheel clutches 27, 28 are out of order. In this case, the controller 35 disengages the cut-off clutch in step S42. Thus, when both of the wheel clutches 27, 28 are out of order, the driving force is not transmitted to the rear wheels 8, 9 so that the two wheel drive condition by the front wheels is established.

If at least one of the wheel clutches 27, 28 are normal and thus the flag $F_{TRB}=0$, the controller 35, in step S43, judges the value of the initial running flag $F_{INI}$ which takes a value of 0 until the running distance of the vehicle reaches a predetermined value such as 300 m after starting and takes a value of 1 after the running distance reaches the predetermined value. Therefore, the flag $F_{INI}$ is zero at the beginning so that the controller 35 goes to steps S43 and S44. When the engine is started, the controller 35 carries out step S45 and engages the cut-off clutch 26. When the running distance exceeds the predetermined value (300 m in this embodiment), the controller 35 carries out steps S46, S47 and sets the flag $F_{INI}$ at 1.

Therefore, before the running distance reaches the predetermined value, the cut-off clutch 26 is kept on the engaged condition regardless of the condition of the wheel clutches 27, 28.

When the running distance exceeds the predetermined value after starting and thus the flag $F_{INI}$ is changed from 0 to 1, the controller 35 carries out step S48 and judges the value of the torque distribution ratios $T_{RL}$, $T_{RR}$ determined by the control shown in FIG. 3. When both of the torque distribution ratios $T_{RL}$, $T_{RR}$ are zero, that is, the vehicle is in the two wheel drive condition, the cut-off clutch 26 is disengaged in step S49. Thus, the driving force is no longer transmitted to a driven side of the clutch 26 including the rear wheel drive mechanism 20.

When at least one of the torque distribution ratios $T_{RL}$, $T_{RR}$ are not zero, the controller 35 carries out step S50 to judge whether or not the cut-off clutch 26 is engaged. If the cut-off clutch 26 is disengaged, the controller 35 is caused to engage the cut-off clutch 26 by the control signal in step S51. If the cut-off clutch 26 is engaged, the controller 35 holds as it is. In step S52, the controller 35 produces the signals b, c to engage the wheel clutches 27, 28. Thus, when the four wheel drive condition is established, the cut-off clutch 26 is engaged and thereafter, the wheel clutches 27, 28 are engaged to accomplish the torque distribution ratios $T_{RL}$, $T_{RR}$ for the rear wheels 8, 9.

In step S53, the controller 35 judges whether or not both of the wheel clutches 27, 28 are out of order. In the case where both of the wheel clutches 27, 28 are out of order, the controller 35 disengages the cut-off clutch 26 and sets the flag $F_{TRB}$ at the value 1 in steps S54, S55.

As aforementioned, in the case where the wheel clutches 27, 28 are disengaged, that is, where the torque distribution ratios $T_{RL}$, $T_{RR}$ are zero, the cut-off clutch 26 is disengaged (step S49) so that the driven side of the drive shaft 21, the pair of bevel gears 22, 23, drive sides of the axles 24, 25 and drive sides of the wheel clutches 27, 28 will not be driven unnecessarily. Thus, the loss of the driving force can be saved.

Moreover, in the case where the wheel clutches 27, 28 are caused to be engaged, the cut-off clutch 26 is engaged prior to the actual engagement of the wheel clutches 27, 28. Therefore, the driving force from the power plant 3 is sequentially transmitted to the rear wheels 8, 9 so that the torque shock caused by the engagement of the wheel clutches 27, 28 can be obviated.

According to the above control, the cut-off clutch 26 is engaged in the initial running until the running distance reaches the predetermined distance (300 m) after starting so that movable parts, such as the drive shaft 21, the pair of bevel gears 22, 23, drive sides of the axles 24, 25 and drive sides of the wheel clutches 27, 28 and the like are driven in appropriate intervals. As a result, bearing devices, oil sealings and the like associated with the movable parts can be lubricated. The cut-off clutch 26 can be temporarily engaged during any running condition other than the initial running condition so as to provide the movable parts driven by the cut-off clutch 26 with enough lubrication.

Figure 11:
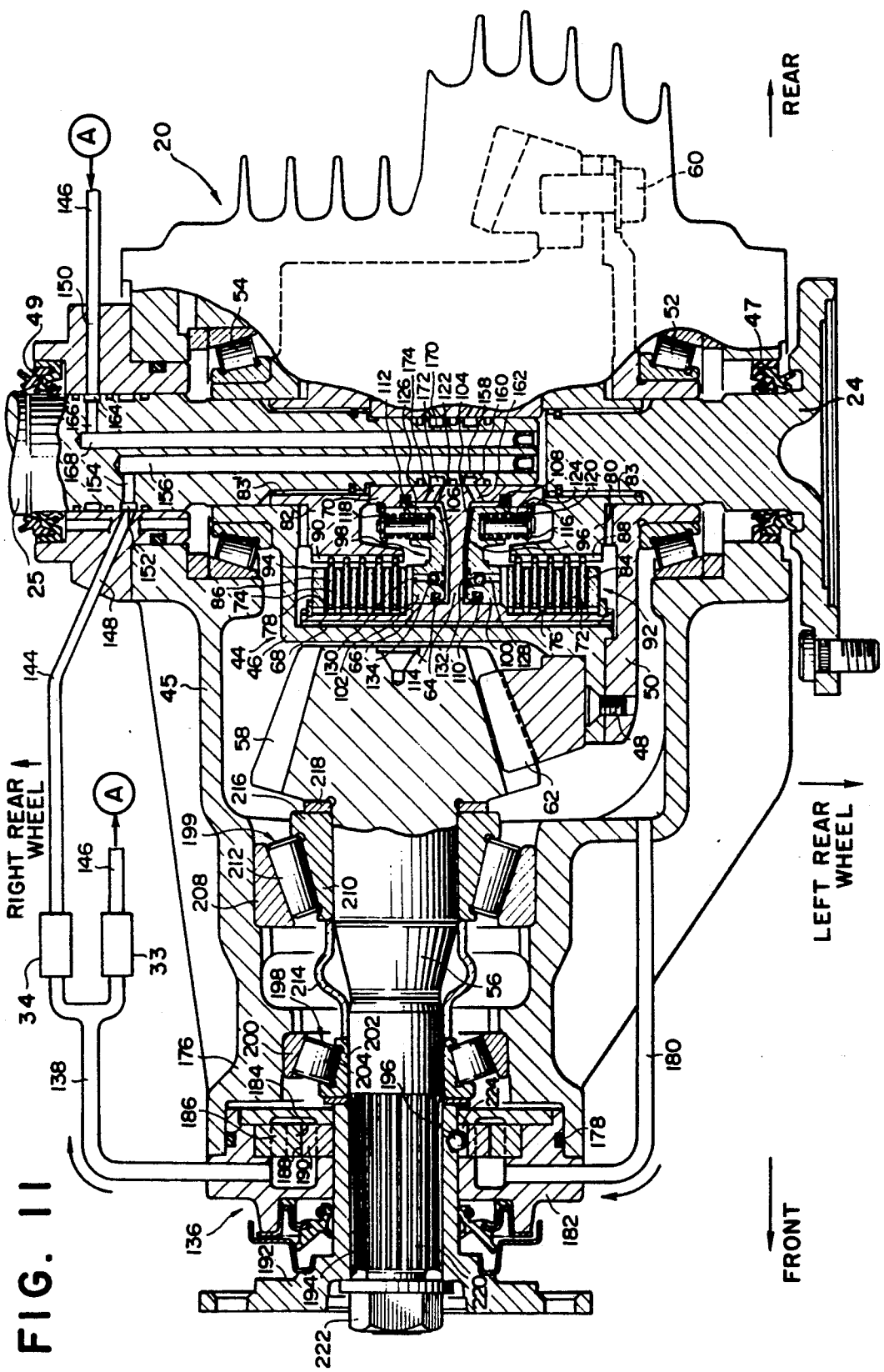
FIG. 11 is a sectional view of a rear wheel drive mechanism in accordance with another embodiment of the present invention.
Figure 12:
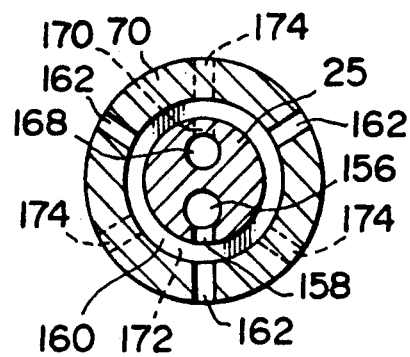
FIG. 12 is a sectional view of a right rear axle in accordance with the embodiment of FIG. 11.
Figure 13:
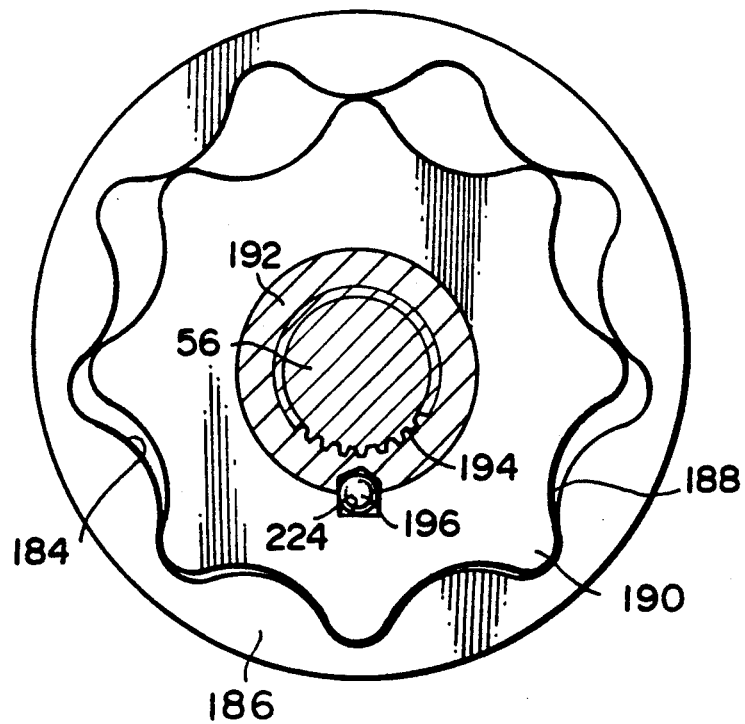
FIG. 13 is a sectional view of an oil pump in accordance with the embodiment of FIG. 11.

Referring to FIGS. 11-13, there is shown another embodiment of the present invention, specifically, another structure of the power transmitting mechanism. According to the second illustrated embodiment, the power transmitting mechanism is employed as a rear wheel drive mechanism 20. This mechanism is used to replace the bevel gears 22, 23 and the wheel clutches 27, 28 in the former embodiment.

The rear wheel drive mechanism 20 is provided with a casing 45 in which the left rear axle 24 and right rear axle 25 are rotatably carried. Oil sealings 47, 49 are disposed between the casing 45 and the axles 24, 25 for sealing.

Within the casing 45, a ring gear case 44 is rotatably mounted on the casing 45. The ring gear case 44 includes a cup like member 46 facing the right axle 24 and lid like member 50 facing the left axle 25 and joined with the cup like member 46 through a bolt 48. The lid like member 50 is rotatably carried by the casing 45 through a roller bearing mechanism 52. The member 50 rotatably carries the left rear axle 24. The cup like member 46 is rotatably carried by the casing 45 through a roller bearing mechanism 54. The member 46 rotatably carries the right rear axle 25.

An input shaft 56 of the rear wheel drive mechanism 20 joined with the drive shaft 21 at a front end is rotatably carried by the casing 45. The input shaft 56 extends in a direction perpendicular to the axles 24, 25. The input shaft 56 is formed at a rear end with a drive pinion gear 58 which is meshed with a ring gear 62 fixed to the ring gear case 44 by means of a bolt 60. The input shaft 56 and the ring gear case 44 constitute a speed reduction mechanism.

There is provided a hydraulic clutch mechanism for transmitting the rotation of the ring gear case 44 to the left and right rear shafts 24, 25 independently.

With the cup like member 46 of the ring gear case 44 is engaged an outer side of a peripheral portion 66 of a support assembly 64 through a spline mechanism 68 formed thereon. The support assembly 64 rotatably carries the axle 25. An inner side of the peripheral portion 66 is engaged with plurality of left clutch plates 72 and right clutch plates 74 through the spline mechanisms 76 and 78. The axles 24, 25 are engaged with ring members 80, 82 through the spline mechanisms 83, 83' at outer surfaces. Outer sides of the ring members 80, 82 are engaged with a plurality of left clutch plates 84 and right clutch plates 86 through spline mechanisms 88, 90. The clutch plates 84, 86, 72 and 74 constitute a left hydraulic clutch 92 and a right hydraulic clutch 94. In order to operate the hydraulic clutches 92, 94, the support assembly 64 is provided with a left hydraulic pressure unit 96 and a right hydraulic pressure unit 98. The hydraulic pressure units 96, 98 are provided with pistons 100, 102, hydraulic chambers 104, 106 formed between the pistons 100, 102 and the support assembly 64. Numerals 108, 110, 112 and 114 designate oil sealings. There are disposed retainers 116, 118 at an outer side of the inner portion 70 and springs 120, 122 between the pistons 100, 102 and the retainers 116, 118. The pistons 100, 102 are urged toward an initial position. The spring 120, 122 is disposed around shafts 124, 126 on which the retainers 116, 118 are mounted. Steel balls 132, 134 are disposed in oil passages 128, 130, communicated with hydraulic chambers 104 and 106, to form check valves which prevent oil flow out of the chambers 104, 106 and allow oil flow to the chambers 104, 106. When hydraulic pressure is not introduced into the chambers 104, 106, the pistons 100, 102 are positioned at the initial positions by virtue of the springs 120, 122 so that the hydraulic clutches 92, 94 are disengaged. Thus, the rotation of the ring gear case 44 transmitted from the input shaft 56 is not transmitted to the left and right axles 24, 25.

When the hydraulic pressure is introduced into the chambers 104, 106, the pistons 100, 102 are moved against the springs 120, 122 to engage the hydraulic clutches 92, 94. As a result, the rotation of the ring gear case 44 transmitted from the input shaft 56 is transmitted to the left and right axles 24, 25.

When the hydraulic pressure is introduced into one of the chambers 104, 106, the driving force is transmitted to the one of the clutches 92, 94 to drive one of the axles 24, 25 or the wheels 8, 9.

Hereinafter, there is described a hydraulic pressure introducing mechanism for the oil chambers 104, 106.

There is provided an oil pump 136 which is driven by the rotation of the input shaft 56. The hydraulic pressure generated in the oil pump 136 is introduced into the right and left control valves 34 and 33 which are duty solenoid valves through an oil passage 138.

Thereafter, the hydraulic pressure is introduced into oil passage 148 for the left hydraulic clutch 92 and oil passage 150 for the right hydraulic clutch 94. Then the hydraulic pressure of the oil passage 148 is introduced into the left oil chamber 104 through annular recess 152, radial oil passage 154, axial oil passage 156, radial oil passage 158, annular recess 160 formed in the right axle 25, and an oil passage 162 formed in the support assembly 64. The annular recesses 152 and 160 are formed in the right axle 25 so that the oil passage 148 can be always communicated with the radial oil passage 154 through the annular recess 152 and the radial oil passage 158 is always communicated with the oil passage 162 as the axle 25 is rotated relative to the casing 45 and the support assembly 64.

Likewise, the hydraulic pressure of the oil passage 150 is introduced into the oil chamber 106 through annular recess 164, radial oil passage 166, axial oil pressure 168, annular oil passage 172 formed in the right axle 25, and oil passage 174 of the support assembly 64.

When the control valves 33, 34 are controlled independently, the hydraulic pressure of the chambers 104 and 106 can be controlled independently.

The oil pump 136 is mounted on an end portion 176 of the casing 45. An oil sealing 178 is disposed between the end portion 176 of the casing 45 and the oil pump 136 for sealing. Numeral 180 designates an oil return passage for returning the oil in the casing 45 to the oil pump 136.

Referring to FIG. 4, FIGS. 11 and 13 the pump 136 is of a trochoidal configuration and is provided with a pump housing 182, an outer ring assembly 186 rotatably disposed in the pump housing 182 and formed with inner teeth 184 and an inner ring assembly 190 rotatably disposed in the outer ring assembly 186 and formed with outer teeth 188. The outer ring assembly 186 has a different rotation axis from the inner ring assembly 190 so that the inner teeth 184 of the outer ring assembly 186 are partly meshed with the outer teeth 188 of the inner ring assembly 190. A flange member 192 is engaged with the input shaft 56 through a sprine mechanism 194. The flange 192 is engaged with the inner ring assembly 190 through a steel ball 196.

Since the flange 192 is rotated integrally with the input shaft 56, the inner ring assembly 190 is also rotated to rotate the outer ring assembly 186. This rotation of the inner and outer ring assemblies 186 and 190 produces the hydraulic pressure which is introduced into the oil passage 138.

Roller bearing mechanisms 198, 199 are provided within the casing 45 for rotatably carrying the input shaft 56. The roller bearing mechanism 198 is provided with a support member 200 mounted on the casing 45, a support member 202 mounted on the input shaft 56 and roller bearings 204 between the members 200 and 202. Likewise, the roller bearing mechanism 199 is provided with a support member 208 mounted on the casing 45, a support member 210 mounted on the input shaft 56 and roller bearings 212 between the members 208 and 210. The support members 202 and 210 are movable for adjustment in an axial direction of the input shaft 56. A spring 214 is disposed between the support members 202 and 210 in the axial direction for urging them. The support member 210 abuts against a stopper 218 at a right end portion 216 so that further rightward movement is restricted.

When the input shaft 56 is positioned relative to the casing 45, a bolt 222 at a front end portion 220 thereof is released so that the flange 192 can be moved relative to the input shaft since they are engaged with each other through the spline mechanism 194. This axial movement of the flange 192 causes the support member 202 to be moved in the axial direction of the input shaft 56 against and with the resilient force of the spring 214.

As aforementioned, the axial position of the support member 202 is adjusted so that the input shaft 56 is axially positioned relative to the casing 45. As a result, the drive pinion gear 58 of input shaft 56 can be positioned to be engaged with the ring gear 62 of the ring gear case 44 appropriately: The flange 192 is engaged with the inner ring assembly 190 of the oil pump 190 through the steel ball 196. A recess 224 of the inner ring assembly 190 is extended in the axial direction of the input shaft 56. Thus, as the flange 192 is moved axially, the steel ball can be moved axially within the recess 224 of the inner ring assembly 190 to allow relative movement of the pump 136 and the flange 192. In other words, the axial movement of the flange 192 does not affect the pump badly.

In the above embodiment, although the drive mechanism is applied to the rear wheel drive mechanism, the above mechanism can be similarly applied to the front wheel drive mechanism 10. The driving force of the power plant 3 can be controlled for the respective wheels 6, 7, 8 and 9 through the control of the control valves 33, 34 in combination with the control of the clutch 26 as well as the former embodiment so that the same effect can be obtained as the embodiment.

It should be noted that although the present invention is described in connection with a specific embodiment making reference to the accompanying drawings, many modifications can be made by the those skilled in the art based on the foregoing, and all of modifications are intended to be included within the scope of the present invention as defined by the attached claims.

What is claimed is:

1. A four wheel drive system of a vehicle comprising:
a power plant for producing a driving force,
a front wheel driving mechanism for transmitting the driving force to drive right and left front wheels,
a rear wheel driving mechanism for transmitting the driving force to drive right and left rear wheels,
right and left wheel clutches provided in one of the driving mechanisms for controlling the amount of the driving force transmitted to wheels driven through the one of the driving mechanisms, said right and left wheel clutches being controlled to disengage the wheels driven through the one of the driving mechanisms in a predetermined disengaging condition,
a cut-off clutch for controlling the driving force transmitted to the wheels driven through the one of the driving mechanisms, and
control means for engaging the cut-off clutch before the right and left wheel clutches are restored to an engaged condition from said predetermined disengaging condition.

2. A four wheel drive system as recited in claim 1 wherein the control means disengages the cut-off clutch after the right and left wheel clutches are disengaged.

3. A four wheel drive system as recited in claim 1 wherein the control means disengages the right and left wheel clutches when an anti-lock braking system is in operation.

4. A four wheel drive system as recited in claim 1 wherein the control means increases a torque distribution ratio for the rear wheels as a speed difference between the front wheels and the rear wheels is increased.

5. A four wheel drive system as recited claim 1 wherein the control means increases a torque distribution ratio for the rear wheels as a speed difference between the right wheels and the left wheels is increased.

6. A four wheel drive system as recited in claim 1 wherein the control means increases a torque distribution ratio for the rear wheels as vehicle speed is increased.

7. A four wheel drive system as recited in claim 1 wherein the cut-off clutch is temporarily engaged at a predetermined time interval when both the cut-off clutch and the right and left wheel clutches are disengaged.

8. A four wheel drive system as recited in claim 1 wherein each of the right and left wheel clutches is a multi-late hydraulic clutch operated by a hydraulic pressure which changes engaging forces of the right and left wheel clutches continuously.

9. A four wheel drive system as recited in claim 1, and further comprising a pair of control valves for driving the right and left wheel clutches, the control valves being controlled by the control means to control hydraulic pressure introduced into the right and left wheel clutches so that respective engaging forces of the right and left wheel clutches are changed.

10. A four wheel drive system as recited in claim 9 wherein each of the control valves is a solenoid valve controlled by a control signal from the control means.

11. A four wheel drive system as recited in claim 1 and further comprising a speed reduction mechanism connected with an input shaft of the one of the driving mechanisms for reducing a rotation speed of an input shaft transmitted to the wheels driven through the one of the driving mechanisms.

12. A four wheel drive system as recited in claim 11 wherein the speed reduction mechanism comprises a ring gear case in which the wheel right and left clutches are disposed.

13. A four wheel drive system as recited in claim 12, and further comprising a pair of control valves controlled by the control means for controlling a hydraulic pressure introduced into the right and left wheel clutches so that engaging forces of the right and left wheel clutches are changed, respectively, and an oil pump connected with and driven by an input shaft of the one of the driving mechanisms for producing the hydraulic pressure for the right and left wheel clutches.

14. A four wheel drive system of a vehicle comprising:
   a power plant for producing a driving force,
   a front wheel driving mechanism for transmitting the driving force to drive right and left front wheels,
   a rear wheel driving mechanism for transmitting the driving force to drive the right and left rear wheels,
   right and left wheel clutches provided in one of the driving mechanisms for controlling the amount of the driving force transmitted to wheels driven through the one of the driving mechanisms,
   a cut-off clutch for controlling the driving force transmitted to the wheels driven through the one of the driving mechanisms,
   control means for engaging the cut-off clutch before the right and left wheel clutches are engaged,
   a speed reduction mechanism connected with an input shaft of the one of the driving mechanisms for reducing a rotation speed of an input shaft transmitted to the wheels driven through the one of the driving mechanisms, the speed reduction mechanism comprising a ring gear case in which the right and left wheel clutches are disposed,
   a pair of control valves controlled by the control means for controlling a hydraulic pressure introduced into the right and left wheel clutches so that engaging forces of the right and left wheel clutches are changed, respectively, and an oil pump connected with and driven by an input shaft of the one of the driving mechanisms for producing the hydraulic pressure for the right and left wheel clutches, and
   a casing in which the ring gear case and the oil pump are disposed.

15. A four wheel drive system for a vehicle comprising:
   a power plant for producing a driving force,
   a front wheel driving mechanism for transmitting the driving force to drive right and left front wheels,
   a rear wheel driving mechanism for transmitting the driving force to drive right and left rear wheels,
   right and left wheel clutches provided in one of the front and rear wheel driving mechanisms for controlling an amount of the driving force transmitted to wheels driven through the one of the front and rear wheel driving mechanisms,
   a cut-off clutch interposed between the power plant and the right and left wheel clutches for controlling the driving force transmitted to the wheels driven through the one of the front and rear wheel driving mechanisms, and
   control means for engaging the cut-off clutch before the right and left wheel clutches are engaged.

* * * * *